United States Patent [19]

Berg

[11] 4,025,933

[45] May 24, 1977

[54] MULTIPLE ADAPTER PLUG FOR INSTAMATIC-TYPE CAMERAS

[75] Inventor: George R. Berg, Chicago, Ill.

[73] Assignee: Acme-Lite Manufacturing Co., Chicago, Ill.

[22] Filed: Nov. 3, 1975

[21] Appl. No.: 628,232

[52] U.S. Cl. .............................. 354/141; 240/1.3; 354/145
[51] Int. Cl.² ...................................... G03B 15/05
[58] Field of Search ............ 354/141, 145; 240/1.3

[56] References Cited
UNITED STATES PATENTS

| | | |
|---|---|---|
| 2,898,447 | 8/1959 | Hanlon .............................. 240/1.3 |
| 3,703,131 | 11/1972 | Brigham ........................ 354/141 X |
| 3,731,605 | 5/1973 | Kitagawa ........................... 354/141 |
| 3,852,790 | 12/1974 | Robinson ........................... 354/141 |
| 3,858,227 | 12/1974 | Ellin et al. ......................... 354/145 |

*Primary Examiner*—Joseph W. Hartary
*Attorney, Agent, or Firm*—Alter and Weiss

[57] ABSTRACT

A universal electronic camera flash features a plug with provision for connection to cameras having flash cube sockets, as well as for cameras having flash bar plug sockets. A rotatably adjustable clamp makes possible the mounting of the flash unit on cameras of varying body styles and dimensions, while also providing a means for angularly adjusting the direction of flash.

5 Claims, 7 Drawing Figures

MULTIPLE ADAPTER PLUG FOR INSTAMATIC-TYPE CAMERAS

BACKGROUND OF THE INVENTION

This invention relates generally to electronic flash units for cameras, and more particularly to a flash unit for use with instamatic-type cameras, having either standard flash cube or flash bar plug sockets.

The instamatic-type camera has enjoyed remarkable commercial popularity, primarily due to its compact size, ease of loading and operation and low price. Initially, the camera was a simple, unsophisticated photographic device, primarily intended for the non-technical, amateur photographer who required a small, convenient camera. As the cameras themselves have become technically more flexible and the users of such cameras have become more knowledgeable in the areas of camera use and accessories, a need has developed to make available to the user of the instamatic-type camera some of the equipment and accessories designed for use with more sophisticated equipment.

Recognizing this, manufacturers have started to offer instamatic-type cameras with a wide range of special features, including such things as built-in telescopic lenses, automatic light metering systems, and electronic shutters. One manufacturer has even introduced a motor drive mountable on its instamatic-type camera.

One example of this increased awareness is in the area of flash attachments. Instamatic-type cameras generally make one of two provisions for the use of flash in picture taking. One is the now-familiar cube socket which accommodates a flash element having four faces, each of which acts as a separate flash bulb. The most popular and widely used of such flash elements is percussively fired by a striker which projects outwardly from the cube socket when the shutter release is pressed. Thus, no battery is necessary to fire such a flash element. As each face is flashed, the element is rotated to bring an unfired face into position. After all four faces have been flashed, the element is then discarded. A second type of flash unit more recently introduced is the flash bar, comprising a generally rectangular arrangement of flash elements in four rows of two each. The ends of the flash bar are adapted to fit a specially shaped and dimensioned slot on an instamatic-type camera, and as the camera shutter is tripped, the flash elements in the flash bar are ignited in sequence. When half of the elements have been fired, the flash bar is removed, reversed and reinserted to enable the remaining flash elements to be fired.

Both the flash bar and the flash cube share several important shortcomings. The most apparent is that each is intended to be used once and then discarded. This means that a photographer doing a considerable amount of flash shooting must carry with him an adequate supply of either flash bars or flash cubes and must contend not only with the problems of obtaining such flash devices, but of disposing of them after use. Some cameras using the flash cube attachment do not rotate the cube automatically as pictures are taken. Therefore, if the photographer forgets to rotate the cube he may waste a shot if the shutter is tripped with an already expired flash element in position.

Another important disadvantage of the flash cube and flash bar is the need for constantly purchasing replacement units as available units are used up. Thus, operation of an instamatic-type camera using flash represents a constant economic drain.

A partial solution to this problem is disclosed in Universal Mount for Electronic Flash Unit, Ser. No. 367,780, filed on June 7, 1973, which has since issued as U.S. Pat. No. 3,852,790, in which is disclosed an electronic flash unit adapted for use with a camera having a standard flash cube socket. With the introduction of the flash bar, subsequent purchasers of instamatic-type cameras may find that the electronic flash purchased for used with an earlier purchased instamatic-type camera with a flash cube socket is not adaptable for use with a camera having a flash bar socket. Since instamatic-type cameras have become more sophisticated and more expensive, a subsequent purchaser may well decide to keep his older model even while purchasing a new one. Consequently, a need does exist for an electronic flash adapted for use with cameras having either flash cube or flash bar sockets.

Providing electronic flash units for instamatic-type cameras has also presented serious problems to sellers of photographic equipment who heretofore have been required to stock electronic flashes in widely varying styles and designs to accommodate the many variations in construction introduced by manufacturers of instamatic-type cameras. The present invention would enable a seller to reduce his inventory of electronic flash units by providing a single unit suitable for use with instamatic cameras of varying designs and dimensions. Consumer selection is thereby simplified, since a purchaser can choose one flash unit to fit virtually any instamatic-type camera purchased.

This invention has, therefore, the following objects:

To provide electronic flashes for instamatic-type cameras, said flashes having reusable flash elements;

To provide such electronic flash units with mounting means adaptable to a wide range of camera body styles and configurations;

To provide such electronic flash units with adapters making them usable with cameras having either flash cube sockets or flash bar sockets;

To make such flash units angularly adjustable to allow the use of bounce flash in taking pictures;

To provide such flash units with adapter plugs usable with cameras employing either electronic or percussive flash firing mechanisms.

The nature of a preferred embodiment of the invention will become more apparent from a study of the attached drawings, wherein.

Figure 1:
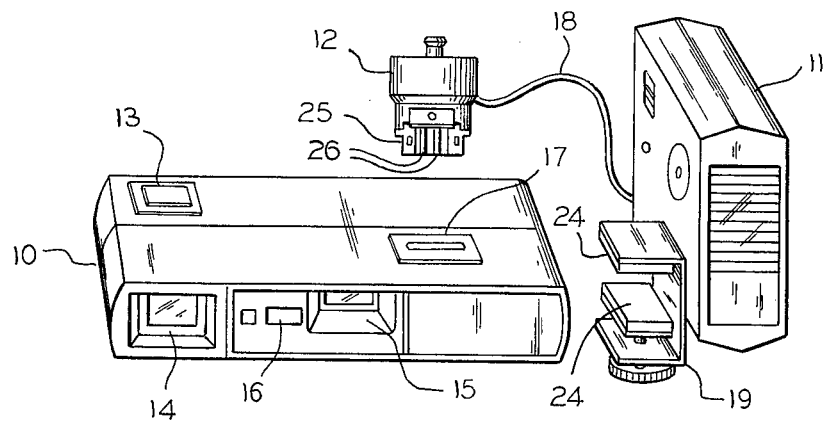
FIG. 1 is a perspective view of an instamatic-type camera designed for use with a flash bar, illustrating the connection of the inventive flash unit to such a camera.

Referring to FIG. 1, the numeral 10 indicates generally an instamatic-type camera shown with flash attachment 11 and plug 12. The camera 10 features a shutter release 13, a view finder 14, a lens 15, light meter aperture 16 and flash socket 17. In this particular example, flash socket 17 is shaped and dimensioned to accommodate a flash bar (not shown). Flash cord 18 extends from flash unit 11 to plug 12, while clamp 19 allows flash attachment 11 to be positioned on camera 10. Shoe 25 positioned at one end of plug 12 is shaped and dimensioned to fit slot 17. Conductor strips 26 cooperate with conductive elements in slot 17 (not shown) to form a conductive path from camera 10 to flash unit 11 as hereinbelow described.

In one version of a camera using a flash bar socket, operation of the shutter release 13 causes a small generator within camera 10 to produce electrical energy which is then transmitted to flash bar socket 17. When used in connection with such a camera, shoe 25 of plug 12 is inserted into flash bar socket 17. When shutter release 13 is pressed, flash unit 11 is fired when activated by the electrical energy produced by the camera generator. Similarly, plug 12 may be designed to provide a circuit adequate to fire flash 11, consistent with the method used by the individual camera manufacturer to activate flash bar socket 17.

Instamatic-type cameras are at present designed, produced and sold to many different companies. Each design is different, with each company placing different controls and features on different parts of the camera. In order to insure that the attachment of the flash 11 does not block or interfere with any of these controls and features, such as the lens 15 or light meter aperture 16, clamp 19 is provided, allowing flash unit 11 to be selectively positionable on camera body 10. In this embodiment, shown in FIG. 3, clamp 19 comprises a bracket 20, with thumb screw 21 threaded through bracket 20 to platform 22, rotatably affixed to the end of the thumb screw shaft 23. Thus, as thumb screw 21 is rotated, platform 22 moves to firmly grasp camera 10 between platform 22 and the upper portion of clamp 19. Resilient pads 24 are provided to prevent marring the camera surfaces.

Figure 3:
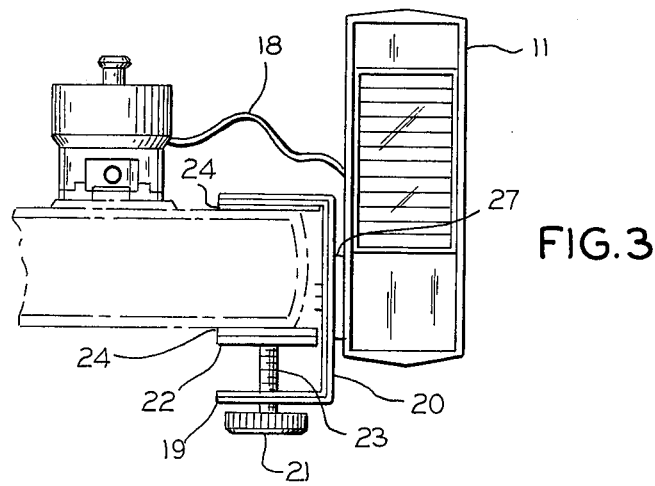
FIG. 3 is a partial front elevation illustrating the attachment of the inventive flash unit to a pocket instamatic-type camera.
Figure 7:
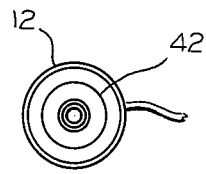
FIG. 7 is a bottom plan view of that aspect of the plug of FIG. 5 adapted for use with a flash cube socket.

In operation, flash unit 11 is positioned on camera 10 to conveniently avoid interfering with any of the features or controls of camera 10. Thumb screw 21 is then turned to adjust platform 22 to the size and contour of camera 10, thereby gripping camera 10 firmly between platform 22 and the upper portion of clamp 19. Shoe 25 of plug 12 is then firmly inserted into flash bar socket 17, and when shutter release 13 is operated, a connection between camera 10 and flash unit 11 is completed through flash bar socket 17, contacts 26 and cord to fire flash unit 11 while shutter 15 is open, thereby providing adequate illumination to take a flash picture. To allow the photographer to change the angle of the flash used, flash unit 11 is attached to bracket 19 at friction fitting 27. Flash unit 11 may then be rotated by hand to any desired angle and will be firmly held there by friction fitting 27. If desired, friction fitting 27 may have formed therein detents (not shown) cooperating with a protrusion on bracket 19 to provide a tactile guide for the photographer of the amount of angular displacement through which flash unit 11 has been rotated. If the particular configuration of the camera with which the flash is to be used requires clamping along a vertical rather than horizontal surface, friction 27 allows bracket 19 to be rotated appropriately. FIG. 3 illustrates the placement of the flash unit 11 on a horizontal surface of camera body 10 with shoe 25 of plug 12 inserted into flash bar socket 17.

Figure 2:
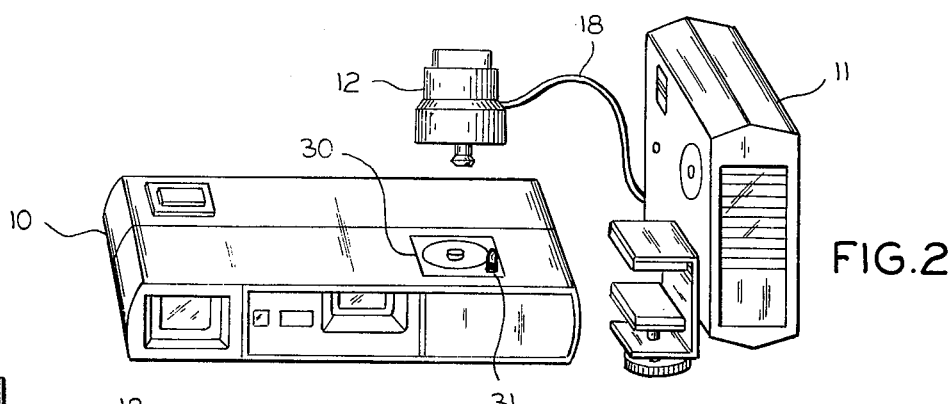
FIG. 2 is a perspective view of an instamatic-type camera designed for use with flash cubes, illustrating the connection of the inventive flash unit to such a camera.
Figure 4:
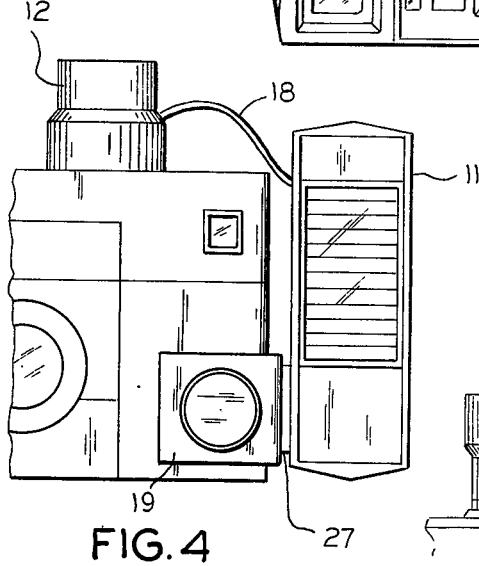
FIG. 4 is a partial front elevation illustrating the attachment of the inventive flash unit to an instamatic-type camera designed to accept 126 size film.
Figure 6:
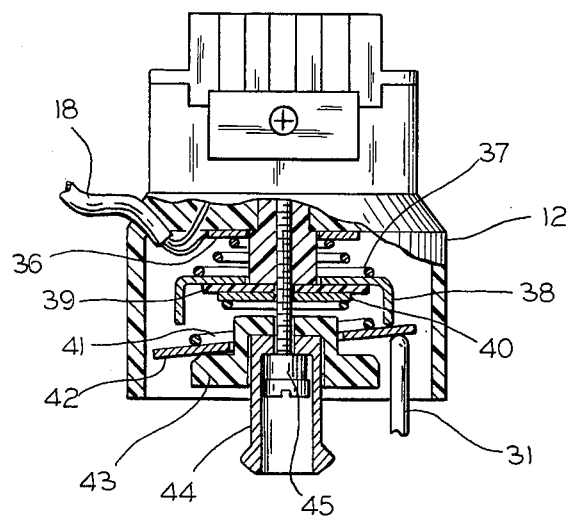
FIG. 6 is an exploded view of the plug illustrated in FIG. 5.

Reversing adapter plug 12 makes it possible to use flash unit 11 in connection with a camera having a standard flash cube socket 30 as shown in FIG. 2. The embodiment shown herein is adapted for use with a flash cube socket in which the cubes are fired percussively. When shutter release 13 is operated, striker 31 is projected upwardly from cube socket 30. Striker 31 then engages floating contact disc 42 and moves it upward into contact with floating collar 38, thus completing a conductive circuit to fire flash unit 11, as illustrated in FIG. 6.

Figure 5:
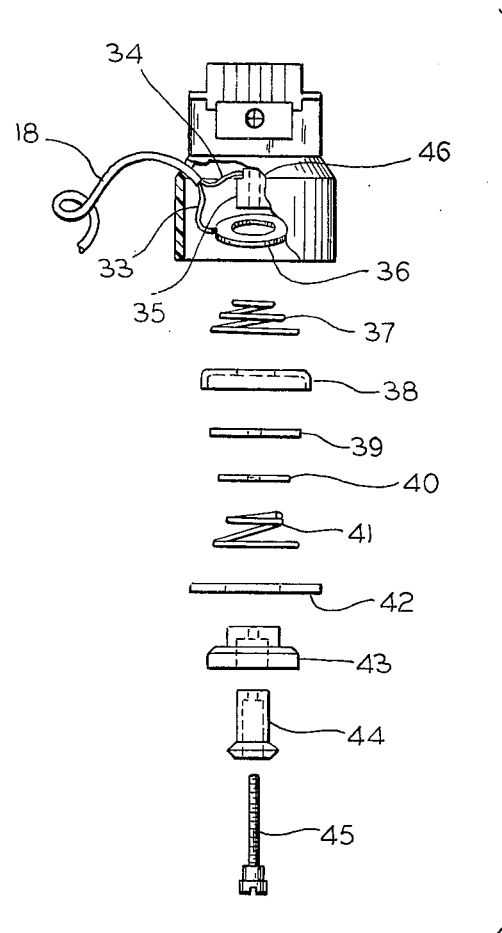
FIG. 5 is a side elevation of the adaptive plug, partially broken away, to illustrate use of the plug with a percussive firing flash cube socket.

FIG. 5 is an exploded view of plug 12, illustrating one embodiment of the invention. Cord 18 is a coaxial, two conductor wire housing shield 33 and lead 34. Shield 33 is attached to collar 36 which is then slip-fitted over shoulder 35 in plug 12. Lead 34 is attached to nut 46, positioned directly over aperture 47. Conductor spring 37 is interposed between collar 36 and floating collar 38, completing one side of the firing circuit. The second side of the firing circuit is formed by screw 45 on which is mounted plug post 44, insulating collar 43, floating contact disc 42, conductor spring 41, and conductor 40, which is threadably mounted onto screw 45. Insulator 39 interposed between connector 40 and floating contact collar 38, prevents completion of the circuit while spring 41 urges floating contact disc 42 and floating collar 38 away from each other. All components are then mounted on screw 45 in the order shown and screw 45 is inserted through aperture 47 in shoulder 35, to threadably engage nut 46. Thus, the two sides of the firing circuit may be described as follows: Side 1 comprises shield 33, collar 36, spring 37 and floating conductor plate 38, while Side 2 comprises floating conductor disc 42, screw 45, nut 46 and lead 34. Completion of the circuit occurs when striker 31 thrusts upwardly from flash cube socket 30, engaging conductor disc 41 and urging it resiliently upward to contact floating contact collar 38. A flash unit is then fired in synchronization with the opening of shutter 15.

It is then seen that a photographer owning an instamatic-type camera with a standard flash cube socket and a second instamatic-type camera having a flash bar socket can easily and conveniently use the invention disclosed herein with both cameras, simply mounting the flash unit on the camera desired to be used.

While the invention described herein has been shown in a specific embodiment, it is understood that such description is by way of example only, and it is not intended to limit the scope of the invention. Surely, others skilled in the art will be able to envision variations without departing from the spirit of the invention.

I claim:

1. In combination with an electronic flash unit, improved means for connecting said flash unit to a camera, said improved connecting means being adapted for use with a camera having sockets adapted to receive either flash cube or flash bars, said flash cube sockets having strikers thereto, said strikers being positionable outward, said flash bar sockets having electrically conductive elements positioned therein, said improved connecting means comprising:

plug means having two male ends;

the first of said two ends being shaped and dimensioned to engagingly cooperate with a flash bar socket on a camera;

said first of said two ends having conductive means therein corresponding to said electrically conductive elements in said flash bar socket;

the second of said two ends being shaped and dimensioned to engagingly cooperate with a flash cube socket on a camera;

said second of said two ends having contact means therein positioned to be engaged by said striker when said striker is outwardly positioned;

means connecting said plug means to said electronic flash unit; and means to selectively position said flash unit on a camera; said positioning means being adapted to face said flash unit forward when mounted on said camera.

2. The apparatus as recited in claim 1, wherein said connecting means comprises a wire having two electrically conductive elements insulated one from the other.

3. The apparatus as recited in claim 1, wherein said contact means comprises a pair of conductive elements resiliently mounted within said plug means.

4. The apparatus as recited in claim 1, wherein said attaching means comprises:
 a clamp body having two ends and a connecting member therebetween, said ends forming with said member generally a C-shape;
 a threaded shaft having two ends;
 a knob mounted on the first of said shaft ends;
 the second of said shaft ends threadably engaging one of said clamp ends and extending therethrough toward the second of said clamp ends;
 a platform rotatably mounted on said second shaft end,
 said platform being selectively positionable between said clamp ends by rotating said shaft with said knob; and
 means rotatably affixing said connecting element of said clamp to said electronic flash unit.

5. In combination with an electronic flash unit, improved means for connecting said flash unit to a camera, said improved connecting means being adaptable for use with cameras having either flash cube or flash bar sockets, said improved connecting means comprising:
 a plug having two males ends;
 a shoe formed at the first of said two ends,
 said shoe being shaped and dimensioned to engagingly cooperate with a flash bar socket on a camera;
 said shoe having electrically conductive means therein corresponding to said electrically conductive elements in said flash bar socket:
 a housing formed at the second of said two ends;
 said housing having protruding therefrom a post,
 said post being shaped and dimensioned to engagingly cooperate with the flash cube socket on a camera,
 said housing having therein an electrically conductive contact,
 said contact cooperating with means in said flash cube socket to complete an electrically conductive path;
 means connecting said plug to said electronic flash unit,
 said connecting means cooperating with said conductive means in said shoe and said contact means in said housing to form a conductive path from said camera to said electronic flash unit; and
 a clamp body having two ends and a connecting member therebetween, said ends forming with said member generally a C-shape,
 a threaded shaft having two ends;
 a knob mounted on the first of said shaft ends,
 the second of said shaft ends threadably engaging one of said clamp ends and extending therethrough toward the second of said clamp ends,
 a platform rotatably mounted on said second shaft end,
 said platform being selectively positionable between said clamp ends by rotating said shaft with said knob, and
 means adjustably affixing said connecting member of said clamp to said electronic flash unit, whereby said flash unit may be faced forward when mounted on said camera.

* * * * *

UNITED STATES PATENT AND TRADEMARK OFFICE
CERTIFICATE OF CORRECTION

PATENT NO. : 4,025,933
DATED : May 24, 1977
INVENTOR(S) : George R. Berg

It is certified that error appears in the above-identified patent and that said Letters Patent are hereby corrected as shown below:

| | |
|---|---|
| In the Title | Delete "INSTAMATIC-TYPE" |
| Column 1, Lines 3 & 8 | Delete "instamatic-type" |
| Column 1, Lines 10, 20, 24 28, 30 and 47 | Delete "instamatic-type" and insert instead -- instant load -- |
| Column 2, Lines 1, 9-10, 12 14, 20, 25-26, 29, 32, 34, 51, 54 & 61-62 | Delete "instamatic-type" and insert instead -- instant load -- |
| Column 3, Lines 4 & 29 | Delete "instamatic-type" and insert instead -- instant load -- |
| Column 4, Lines 46-47 & 48 | Delete "instamatic-type" and insert instead --instant load -- |
| Column 2, Lines 59-60 | Delete "a pocket instamatic-type" and insert instead -- an instant |

Signed and Sealed this

Twentieth Day of March 1979

[SEAL]

Attest:

RUTH C. MASON
Attesting Officer

DONALD W. BANNER
Commissioner of Patents and Trademarks